United States Patent [19]

Harrington

[11] Patent Number: 5,621,054
[45] Date of Patent: Apr. 15, 1997

[54] COPOLYMERIZATION PROCESS FOR THE PREPARATION OF CRYSTALLINE COPOLYMERS OF OLEFINS AND CYCLIC OLEFINS

[75] Inventor: Bruce A. Harrington, Houston, Tex.

[73] Assignee: Exxon Chemical Patents Inc., Wilmington, Del.

[21] Appl. No.: 472,372

[22] Filed: Jun. 7, 1995

[51] Int. Cl.$^6$ .................... C08F 4/643; C08F 232/04; C08F 232/08

[52] U.S. Cl. .................... 526/126; 526/133; 526/434; 526/160; 526/170; 526/281; 526/283; 526/308

[58] Field of Search .................... 526/281, 308, 526/170, 126, 133, 134, 160, 161, 283

[56] References Cited

U.S. PATENT DOCUMENTS

| | | |
|---|---|---|
| 5,204,429 | 4/1993 | Kaminsky et al. . |
| 5,227,440 | 7/1993 | Canich et al. .................... 502/103 |
| 5,264,405 | 11/1993 | Canich .................... 502/103 |
| 5,324,801 | 6/1994 | Brekner et al. . |
| 5,498,677 | 3/1996 | Weller et al. .................... 526/281 X |

FOREIGN PATENT DOCUMENTS

| | | |
|---|---|---|
| 2115196 | 8/1994 | Canada . |
| 0420436A1 | 4/1991 | European Pat. Off. . |
| 0610814A2 | 8/1994 | European Pat. Off. . |

OTHER PUBLICATIONS

Walter Kaminsky, "New Materials by Polymerization of Cyclic Olefins with Metallocene Catalysts", Paper for MET-CON '93, Houston, Texas, May 26–28, 1993, pp. 325–335.

Cherdon et al, "Cycloolefin Copolymers: A New Class of Transparent Thermoplastics", Die Angewandte Makromolekulare Chemie, 223, pp. 121–133 (1994) Translation by Robert Saxon Jan. 16, 1995.

"Ethylene–cyclic Mono Olefin Copolymer" p. 738 Research Disclosure Nov. 1993.

*Primary Examiner*—Fred Teskin
*Attorney, Agent, or Firm*—W. G. Muller

[57] ABSTRACT

A copolymerization process suitable for the preparation of high crystalline melting point cyclic olefin copolymers comprising contacting ethylene, and at least one cyclic olefin with an active polymerization catalyst comprising a Group 4 transition metal compound containing an asymmetrically substituted monocyclopentadienyl ancillary ligand, a bulky substituent-containing heteroatom ligand, the monocyclopentadienyl and heteroatom ligands being covalently bridged is disclosed. Ethylene/norbornene copolymers prepared in accordance with the invention exhibited crystalline melting points of about 250° C., and were prepared at high catalyst activity levels with feed ratios less than 6:1 of norbornene to ethylene.

10 Claims, No Drawings

COPOLYMERIZATION PROCESS FOR THE PREPARATION OF CRYSTALLINE COPOLYMERS OF OLEFINS AND CYCLIC OLEFINS

FIELD OF THE INVENTION

The invention relates to a polymerization process for the preparation of semicrystalline copolymers of olefins and cyclic olefins without ring-opening metathesis. Specific catalysts suitable in the process include bridged, monocyclopentadienyl catalyst compounds with alumoxane or ionizing catalyst activators.

BACKGROUND

The polymerization of cyclic olefins, either alone, or with copolymerizable monomers, particularly olefins, has been significantly advanced with the discovery of the effectiveness of metallocene catalysts for coordination polymerization. Crystalline homopolymers can be prepared from the use of stereorigid, chiral metallocenes that yield conformationally regular or stereospecific polymers. See, New Materials by Polymerization of Cyclic Olefins with Metallocene Catalysts, W. Kaminsky, Paper for METCON '93, Houston, Tex. May 26–28, 1993, p. 325–335. Copolymerization with α-olefins can result in elastomeric polymers due to disruption of the crystallinity caused by the olefin incorporation. See, U.S. Pat. No. 5,204,429.

More recently it has been discovered that by careful selection of the ligand structure of the metallocene catalysts, copolymers having crystalline attributes can be prepared by copolymerizing olefins with the cyclic olefins. U.S. Pat. NO. 5,324,801 describes a process for the preparation of cycloolefin copolymers having from 1 to 80% of at least one cyclic olefin comprising copolymerization with an acyclic olefin in the presence of sandwich structured metallocenes where the sandwiching ligands are connected or bridged so as to form a ring. Preferred copolymers are said to have incorporation ratios of 40:60 to 60:40 of the cyclic olefin to acyclic olefin. Using the sandwich metallocenes exhibiting $C_1$ symmetry, with the preferred ligands being fluorenyl and cyclopentadienyl, copolymers of alternating sequence ethylene and either of norbornene or tetracyclododecene were prepared having crystalline melting points of 235° C. to 335° C. and molar ratios ranging from 50:50 to 41:59, cyclic olefin to acyclic olefin. Due to transparency the polymers are said to be suitable as glass substitutes, and suitable in polymer alloys. Further product description appears in Cherdon, et al, Cycloolefin Copolymers: A New Class of Transparent Thermoplastics, *Angew. Chem.* 223, 121–133 (1994).

Since these crystalline and semi-crystalline copolymers of ethylene, α-olefins, and cyclic olefins exhibit uniquely interesting physical properties, alternative means of preparing them, with potential improvements in ease of catalyst synthesis, increased polymerization efficiencies, increased cyclic olefin incorporation efficiencies and differing copolymer product characteristics are of great interest. Accordingly work was done to develop catalyst systems different from those previously discovered to be capable of such copolymerization processes.

SUMMARY OF THE INVENTION

The invention thus is a copolymerization process suitable for the preparation of high crystalline melting point cyclic olefin copolymers comprising contacting ethylene and at least one cyclic olefin, under suitable polymerization conditions, with an active polymerization catalyst comprising a Group 4 transition metal compound containing an asymmetrically substituted monocyclopentadienyl ancillary ligand, a bulky substituent-containing heteroatom ligand, the monocyclopentadienyl and heteroatom ligands being covalently bridged.

DESCRIPTION AND EXAMPLES

The cyclic olefin copolymers for which the invention process is suitable include those having both sequence regularity and conformational regularity. Sequence regularity means here essentially alternating sequences of cyclic olefin monomer and ethylene. Conformational regularity, or sterospecificity, is the result of consistent molecular coordination geometries. These characterizing features assure that the copolymer can exhibit initial crystalline melting points from about 150° C. to 350° C., particularly 200° C. to 300° C., as measured by differential scanning calorimetry (DSC) conducted at a heating rate of 10° C. per minute from −50° to 350° C. These copolymers typically have an intrinsic viscosity of 0.05 dl/g to 20 dl/g as measured at 135° C. in decalin. Molecular weight distribution, or polydispersity (MWD), is typically narrow, ranging from about 1.1 up to 6.0, preferably 1.2 to 4.5, more preferably 2.0 to 4.0 as calculated from molecular weights measured by gel permeation chromatography (GPC) referenced to a known polyethylene standard in accordance with traditional methods. Although an MWD <2.0 is not typical in traditional Ziegler-Natta polymerization, the use of certain polymerization conditions for the copolymerization in accordance with this invention can result in polymerization analogous to "living" anionic polymerizations which are typified with MWD characterizations below 2.0.

Ethylene is the preferred comonomer in that using the catalyst system of this invention, $C_3$ and higher carbon number a-olefins are not typically capable of copolymerization sequences consistent with production of the semicrystalline polymers of the invention. This phenomena is notable, in the prior art relating to cyclic olefin copolymers, the $C_3$ and higher carbon number α-olefins are typically said to be readily copolymerized in almost any incorporation ratio to the cyclic olefins.

Suitable cyclic olefins include those having at least 4 carbon atoms and one coordination polymerizable ethylenic unsaturation site. Such olefins include those with multicyclic structures and those having additional hindered or masked ethylenic unsaturation not readily available to coordination addition reactions at the catalyst coordination site. These olefins are most usually hydrocarbyl but may include low levels of non-carbon, heteroatoms when such are, again, hindered, shielded or masked so as to not be capable of coordination at the catalyst coordination site.

Though these olefins preferably contain only unsubstituted ring members, substitution can be tolerated where by location or site there is insignificant disruption of the overall crystalline configuration of the copolymer composition made by the invention process. Preferably substitution will be with $C_1$–$C_6$ hydrocarbyl ligands not located on one of the ethylenically bonded carbon atoms.

Preferred cyclic olefins include cyclobutene, cyclopentene, cyclooctene, norbornene, 5-methylnorbornene, 3-methylnorbornene, ethylnorbornene, phenylnorbornene, dimethylnorbornene, diethylnorbornene, dicyclopentadiene, tetracyclododecene, methyltetracyclododecene, and the like. Additionally suitable cyclic olefins include those known in the art, exemplary description can be found in WO-94/17113 and U.S. Pat Nos. 5,270,393 and 5,324,801, all of which are incorporated by reference for purposes of U.S. patent practice.

The preferred heteroatom-containing, monocyclopentadienyl Group 4 metal catalysts are in the class compromising covalently bridged Group 4 metal-containing compounds having the generic formula:

where $R_1$ and $R_2$ are the same or different univalent ligands capable of ethylene insertion or capable of abstraction and replacement with a ligand capable of ethylene insertion; J is a Group 15 heteroatom which is covalently bridged to Cp through a connecting group T and which contains a univalent substituent sufficiently bulky to shield M from direct approach by the cyclic olefins; and Cp is an η05-cyclopentadienyl ring derivative having substitution on ring atom members such that it is asymmetric to a line drawn between the bridging ring member and a point on the opposite side of the ring.

$R_1$ and $R_2$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{10}$-arylalkyl group, a $C_8$–$C_{10}$-alkylaryl group or a $C_8$–$C_{10}$-arylalkenyl group.

J is the heteroatom containing ligand and includes $C_3$–$C_{30}$ hydrocarbyl ligands such as isopropyl, tert-butyl, adamantyl, cyclododecyl, etc., as the univalent, bulky ligand. Preferably the bulky univalent ligand will comprise a secondary, more preferably a tertiary carbon, bound to the heteroatom so as to provide broadest bulk for hindrance of the approach of cyclic olefins to the catalyst coordination site. Ligands described in copending application U.S. Ser. No. 08/487,255, filed Jun. 7, 1995 and in WO 96/00244 are particularly suitable, the description of which is incorporated by reference for purposes of U.S. patent practice.

The covalent bridging group T between J and Cp typically contains Group 13–15 elements having hydrogen and/or carbon or silicon element comprising ligands. Preferably T comprises methylene, ethylene or silylene, any of which can have alkyl, aryl, alkyaryl, preferably $C_1$–$C_{20}$, or silyl substituents.

Specific examples include monocyclopentadienyl catalyst compounds having substitutions selected from known classes of ligand groups readily synthesized analogously to those available in the literature. Description is given in U.S. Pat. Nos. 5,055,438, 5,096,867, 5,264,400, and WO 92/00333, among others, each is incorporated by reference for purposes of U.S. patent practice. In particular, a preferred compound is dimethylsilyl (3-tert-butylcyclopentadienyl) (1-adamantylamido) hafnium dimethyl which pictorially exemplifies the class of compounds suitable in this invention. Its diagram is below.

Figure 1:

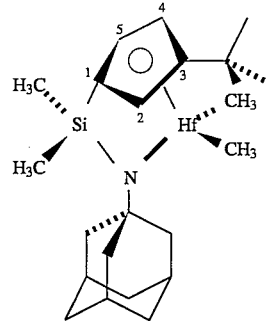

As will be apparent from this description and diagram any alkyl substitution of $C_1$ or higher carbon number or alkyl substituted silyl substituent having at least one carbon atom can be used in the 3-cyclopentadienyl position. In addition disubstituted substitution patterns can be used where two adjacent R groups in the 3-cyclopentadienyl and 2-cyclopentadienyl positions can be the same or different group selected from hydrogen, $C_2$–$C_{18}$ alkyl-substituted silyl and $C_1$–$C_{30}$ hydrocarbyl, such as alkyl, alkenyl, aryl, alkylaryl or arylalkyl radicals, including those structures where two adjacent R substituents are bound together to form a further $C_1$–$C_{20}$ substituted or unsubstituted ring system, such as cyclohexyl, indenyl, benzyindenyl, etc. Any derivatives, such as 3-phenyl-indenyl and the like will be suitable. The substituted cyclopentadienyl derivatives may have ring positions 4 and/or 5 substituted, so long as they are substituted with such as to preserve the asymmetric substitution pattern.

For clarity the cyclopentadienyl ring positions are to be numbered as shown above in determining asymmetry.

In a like manner, J may be any known amido, phosphido, etc., heteroatom structure having a bulky substituent in the exocyclic position of the heteroatom as exemplified by the pictured adamantyl group, preferably a $C_1$–$C_{30}$ hydrocarbyl substituted amido or phosphido group.

A compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

An active, ionic catalyst composition comprising a cation of the Group 4 transition metal compound of the invention and a noncoordinating anion result upon reaction of the Group 4 transition metal compound with the ionizing noncoordinating anion precursor. This activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A- 0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172, and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these documents are incorporated by reference for purposes of U.S. patent practice.

The process of the invention is typically conducted in a reaction medium conducive to interaction of the catalyst and the monomers, one that facilitates their contact. Thus a slurry of supported catalyst in liquid cyclic olefin may serve as the reaction medium. Similarly a solution process using typical hydrocarbon solvents will be suitable, preferably the solvent is one of aromatic or cycloaliphatic hydrocarbon compounds, but linear or branched aliphatic compounds will also be suitable. Suitable solvents thus include toluene, cyclohexane, hexane; etc.

The active catalyst may be supported in any manner suitable for the reaction process chosen, particularly when a slurry process is to be used. Numerous methods of support are known in the art for copolymerization processes for olefins, particularly for catalysts activated by alumoxanes, any is suitable for the invention process in its broadest scope. See, for example, U.S. Pat. No. 5,227,440. When using a Lewis acid ionizing catalyst activator a particularly effective method is that described in co-pending application U.S. Ser. No. 08/285,380 filed Aug. 3, 1994. The support method of this co-pending application describes the use of a Lewis add noncoordinating anion precursor (e.g., trisperfluorophenyl boron) which is covalently bound to silica-containing supports through retained hydroxy groups which as an initially formed activator complex donates the hydroxyl hydrogens as protons for protonation of the Group 4 transition metal compound to catalytically active cations. These documents are incorporated by reference for purposes of U.S. patent practice.

The slurry or solution processes in which the contacting of catalyst and monomers is conducted can be done under conditions known to be suitable for the catalyst chosen. Thus, polymerization reaction temperatures can range from below about −20° C. up to about 300° C., and at any temperature in between. Room temperature (20° C.) reactions are convenient but increases in activity are attainable at the higher temperature ranges. Thus, temperatures above 60° C. are suitable, as are those above 100° C., or even at 120° C. and above given the stability of the monocyclopentadienyl catalysts of the invention. The pressure of the polymerization is not critical. Typically ethylene is introduced as a pressurized gas and can be maintained at about 1 to about 15 bar.

The polymerization process of the invention suitably uses the catalyst and activator in accordance with their known methods in the known amounts and under the known conditions. Thus, preactivation or in situ activation, and scavenging, with alumoxane, alkyl aluminas, and ionizing activators, or combinations of them, known to those skilled in the art will be suitable in accordance with this invention. The description of processes in the references cited above are exemplary. Together with the examples of the invention, one of ordinary skill in the art will readily appreciate suitable methods.

It is believed that a catalyst structure as exemplified and described above acts to allow ready polymerization of the bulky cyclic olefins, but preferentially from the unhindered approaches to the metal coordination center and in a manner dictated by the steric constraints of the catalyst compound ligand system and both the shape of the cyclic olefin and the position in it of the polymerizable ethylenic unsaturation. This apparently leads to conformationally regular or stereospecific incorporation. Additionally, the bulk of a first cyclic olefin and the steric constraints of the catalyst ligand system during insertion likely acts to inhibit entry into the coordination center of the catalyst of an immediately subsequent cyclic olefin monomer. Thus insertion of a subsequent cyclic olefin is preceded by the insertion of ethylene which is not so sterically inhibited in entry and which acts when inserted to remove the initially inserted cyclic olefin from the coordination site. A subsequent cyclic olefin in turn is then not inhibited by the inserted ethylene and can readily enter and be inserted. A copolymer results having sequence segments that are essentially of alternating comonomers. This copolymer has insignificant, if any, diads comprising sequentially polymerized cyclic olefins.

The below exemplified catalyst was used to prepare a high melting point, engineering polymer, of ethylene and norbornene, of the present invention. Amounts of greater than 40 mol. % norbornene were readily incorporated into the polymer backbone under the reported polymerization conditions. In contrast to the preferred catalyst of U.S. Pat. No. 5,324,801 (see Background), which are known to be capable of making syndiotactic polypropylene, the contacting of propylene with the invention catalyst yielded essentially no measurable polypropylene polymer. Thus it was entirely unexpected to achieve copolymerization of cyclic monomers, since they are at least as bulky as propylene. Similarly, polynorbornene is known to result from that use of similar biscyclopentadienyl catalysts but could not be produced with the catalysts of this invention. Additionally, the inability to enchain two consecutive bulky monomers such as propylene or cyclic olefin enables the addition of cyclic olefin monomers in broad feed ratios, to ethylene, of from about 3:1 to 30:1 or more without sacrifice of the sought and highly preferred substantially alternating sequence. Since the resulting polymer is essentially free of cyclic-olefin diads a more defect free alternating sequence distribution copolymer results. These copolymers can have higher, and more predictable melting point temperatures.

A copolymer with a melting point temperature of 235° C. was achieved at low feed ratio (7:1) of norbornene to ethylene in U.S. Pat. No. 5,324,801. Yet at lower norbornene to ethylene ratios of less than 6:1 the process of this invention produced copolymers of crystalline melting points above 245° C. See Table 2. This can be translated in industrial practice to a significant economic advantage in terms of cyclic olefin conversion efficiencies and related process advantages.

The copolymers of the invention can be processed into polymer compositions useful in those applications where high crystalline melting point polymers, also known as engineering polymers, have previously found use. Specifically, thermally stable polymer compositions suitable for injection molding similar to polyamides and polyesters are possible, as are the uses known for the hard, thermally stable, transparent polymer compositions of polycarbonate. Thus, optical applications as disclosed in U.S. Pat. No. 5,324,801 are made possible in addition to those applications suggested by the technologies relevant to that of other engineering polymers and resins of similar glass transition temperature or melting point. Additionally, potential compatibilities of these polyolefin engineering polymer compositions make it possible to prepare polymer alloys comprising the invention product and other engineering polymers so as to prepare materials with modified use temperatures.

The following examples illustrate the invention and provide comparative examples illustrating the non-functional capabilities of similar catalysts tested during the development of the invention process.

EXAMPLES

Polymerization of ethylene/norbornene was conducted in accordance with the following procedure under the conditions reported in Table 1, product properties are shown in Table 2. It is notable that only the process according to the invention in examples 1) through 3) was capable of preparing a high crystalline melting point polymer under the selected polymerization conditions, particularly at the low comonomer molar ratios. Under the described conditions, the bridged monocyclopentadienyl catalyst systems of comparative examples 4) through 6), not exhibiting asymmetry in the cyclopentadienyl ring, did not produce high melting temperature cyclic olefin copolymers. The glass transition temperature ($T_g$) is indicative of cyclic olefin incorporation, higher numbers correlate to greater incorporation. Thus comparative example 6) illustrates a comparable incorporation of cyclic olefin as for the invention catalyst but no measurable crystalline melting point. Similarly, biscyclopentadienyl catalyst systems exhibiting asymmetry in one cyclopentadienyl group and a bulky substitution pattern in the other (comparative examples 7-10) did not produce copolymers having measurable crystalline melting point under comparable polymerization conditions.

Example 1

Catalyst Activation

40.0 mg μ-Me$_2$Si(t-BuCp)(1-Adamantyl Amido)HfMe$_2$ (prepared in accordance with the disclosure in co-pending application U.S. Ser. No. 08/487,255 filed Jun. 7, 1995) was weighed out under inert atmosphere and N,N-Dimethylanilinium tetrakis-perfluorophenyl boron (DMAH) B(pfp)$_4$ activator was added to give a slight molar excess of the transition metal complex. 2 mL of dry toluene was added by pipette and the mixture allowed to stand with occasional stirring until activation was complete (10 to 20 min.). The resulting mixture was septa sealed and ready for transfer to the reactor via cannula.

Reactor Conditions

0.8 liter of dry toluene was transferred to a clean, dry and N$_2$ purged 2 liter autoclave reactor using air sensitive technique. The solvent was stirred under a continued slow N$_2$ purge (10 SLPM) while the reactor was equilibrated at 60° C. Triisobutylaluminum (TIBA) was added as a scavenger by diluting 0.5 mL of a 1M solution in toluene with additional toluene (10 to 20 mL) and transferring to the reactor via cannula through the purge port using standard air sensitive technique. 106 g norbornene was added to the reactor as a concentrated solution in toluene (86 wt. %) via cannula through the purge port using standard air sensitive technique. The N$_2$ purge was shut off simultaneously as the reactor was sealed. 15 psig (1 bar) ethylene gas was added to the reactor until the solution was saturated. (Molar feed ratio Norbornene: Ethylene =5.6:1.) The ethylene regulator and flow controller are set to maintain the 15 psig ethylene pressure with a 10 SLPM replenishing flow. The reactor was then quickly vented and the pre-activated catalyst was added to the reactor via cannula through the purge port. The port was then sealed and the ethylene pressure quickly returned to 15 psi by opening the flow controller. The mixture was stirred at 60° C. for 74 minutes.

The reaction was quenched by rapid venting of the rector and its contents poured into one liter of rapidly stirring acetone. The resulting white solid polymer was washed, separated by filtration, and dried in a vacuum oven overnight (60° C., −30 in. Hg). 128.4 g of copolymer was obtained that had a melt temperature of 247° C., $M_w$=39,685, MWD=1.44.

Examples 1-10

The following examples were conducted in a process similar to the one described, but with the conditions shown in Table 1. The resulting copolymer products and the catalyst used to prepare them are described in Table 2.

TABLE 1

| | | Run Conditions | | | | | |
|---|---|---|---|---|---|---|---|
| Exp. # | Solvent (mL) | Activated Catalyst (mg) | Amount Norbornene (g) | Ethylene Pressure (psig) | Molar Feed Ratio (NB:C2) | Reaction Time (Min.) | Yield (g) |
| 1 | 800 | 34.8 | 106 | 15 | 5.6:1 | 74 | 128.4 |
| 2 | 600 | 26.8 | 57 | 15 | 4.2:1 | 55 | 1.54 |
| 3 | 600 | 34.8 | 53 | 15 | 3.9:1 | 18 | 38.6 |
| 4 | 600 | 26.3 | 53 | 15 | 3.9:1 | 40 | 75.2 |
| 5 | 600 | 26.3 | 53 | 15 | 3.9:1 | 85 | 71.0 |
| 6 | 600 | 16.0 | 53 | 5 | 6.1:1 | 30 | 26.1 |
| 7 | 800 | 20.0 | 94 | 15 | 5:1 | 60 | 62.0 |
| 8 | 800 | 20.0 | 94 | 15 | 5:1 | 60 | 40.1 |
| 9 | 600 | 24.0 | 57 | 15 | 4.2:1 | 22 | 7.8 |
| 10 | 600 | 28.0 | 57 | 15 | 4.2:1 | 60 | 15.4 |

TABLE 2

| | Catalyst & Copolymer Characteristics | | | | |
|---|---|---|---|---|---|
| Example No. | Catalyst | Symmetry | Tm (°C.) | Tg (°C.) | Mw (PE Std) [MWD] |
| 1 | μ-Me$_2$Si(t-BuCp)(1-Adamantyl Amido) HfMe$_2$ | C$_1$ | 247 | 94 | 40K [1.44] |
| 2 | μ-Me$_2$Si(t-BuCp)(1-Adamantyl Amido) HfMe$_2$ | C$_1$ | 250 | 121 | 47K [1.40] |
| 3 | μ-Me$_2$Si(t-BuCp)(1-Adamantyl Amido) HfMe$_2$ | C$_1$ | 248 | 119 | 54K [1.65] |
| 4 | μ-Me$_2$Si(Me$_4$Cp)(1-Adamantyl Amido) TiMe$_2$ | Cs | — | 82 | 191K [1.78] |
| 5 | μ-Me$_2$Si(Me$_4$Cp)(1-Adamantyl | Cs | — | 75 | 248K [1.36] |

TABLE 2-continued

Catalyst & Copolymer Characteristics

| Example No. | Catalyst | Symmetry | Tm (°C.) | Tg (°C.) | Mw (PE Std) [MWD] |
|---|---|---|---|---|---|
| 6 | μ-Me$_2$Si(Me$_4$Cp)(cyclododecyl Amido) TiMe$_2$ | Cs | — | 114 | 624K [1.89] |
| 7 | μ-Me$_2$Si(Me$_4$Cp)(MeCp) ZrMe$_2$ | C$_1$ | — | 8 | 137K [2.07] |
| 8 | μ-Me$_2$Si(Me$_4$Cp)(MeCp) ZrMe$_2$ | C$_1$ | — | ~5 | 135K [1.97] |
| 9 | μ-Me$_2$Si(Cp)(2MeInd) HfMe$_2$ | C$_1$ | — | 134 | 87K [1.72] |
| 10 | μ-Me$_2$Si(Cp)(2MeInd) HfMe$_2$ | C$_1$ | — | 130 | 78K [1.83] |

I claim:

1. A copolymerization process suitable for the preparation of high crystalline melting point cyclic olefin copolymers comprising contacting ethylene and at least one cyclic olefin, under suitable polymerization conditions, with an active polymerization catalyst comprising a hafnium or zirconium transition metal compound containing an asymmetrically substituted monocyclopentadienyl ancillary ligand, a bulky substituent-containing heteroatom ligand, the monocyclopentadienyl and heteroatom ligands being covalently bridged.

2. The process in accordance with claim 1 wherein said transition metal compound comprises hafnium.

3. The process in accordance with claim 1 wherein said bulky substituent-containing heteroatom ligand comprises a hydrocarbyl substituted amido ligand comprising a tertiary carbon bound to the nitrogen atom.

4. The process in accordance with claim 3 wherein said bulky substituent-containing heteroatom ligand is 1-adamantyl amido.

5. The process in accordance with claim 1 wherein the monocyclopentadienyl and heteroatom ligands are covalently bridged by a group comprising carbon or silicon.

6. The process in accordance with claim 1 wherein said asymmetrically substituted monocyclopentadienyl ancillary ligand comprises in the 3-cyclopentadienyl position at least one alkyl or alkyl substituted silyl substituent having at least one carbon atom.

7. The process in accordance with claim 1 wherein said asymmetrically substituted monocyclopentadienyl ancillary ligand comprises a disubstituted substitution pattern where two adjacent R groups in the 3-cyclopentadienyl and 2-cyclopentadienyl positions are the same or different substituent selected from hydrogen, C$_2$–C$_{18}$ alkyl-substituted silyl, and C$_1$–C$_{30}$ hydrocarbyl.

8. The process in accordance with claim 1 wherein said ethylene and at least one cyclic olefin are contacted with said active polymerization catalyst by introduction into a polymerization medium of one or more feedstreams so as to establish a feedstream ratio of cyclic olefin to ethylene of less than or equal to about 6.0.

9. The process in accordance with claim 6 wherein said at least one alkyl substituent comprises tert-butyl.

10. The process in accordance with claim 9 wherein said bulky substituent-containing heteroatom ligand is 1-adamantyl amido.

* * * * *